(12) United States Patent
Marinet (10) Patent No.: US 8,434,046 B2
(45) Date of Patent: Apr. 30, 2013

(54) METHOD OF FABRICATING AN INTEGRATED CIRCUIT PROTECTED AGAINST REVERSE ENGINEERING

(75) Inventor: Fabrice Marinet, Chateauneuf le Rouge (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 13/299,267

(22) Filed: Nov. 17, 2011

(65) Prior Publication Data

US 2012/0131533 A1    May 24, 2012

(30) Foreign Application Priority Data

Nov. 18, 2010 (FR) ..................... 10 04497

(51) Int. Cl.
*G06F 17/50* (2006.01)
(52) U.S. Cl.
USPC .......................... 716/119; 716/123
(58) Field of Classification Search ........... 716/118–125
See application file for complete search history.

(56) References Cited

U.S. PATENT DOCUMENTS

| | | | | |
|---|---|---|---|---|
| 5,764,533 | A * | 6/1998 | deDood | 716/122 |
| 6,031,982 | A * | 2/2000 | Truong et al. | 257/208 |
| 6,064,110 | A | 5/2000 | Baukus et al. | |
| 7,360,193 | B1 * | 4/2008 | Burstein et al. | 716/122 |
| 2010/0058267 | A1 | 3/2010 | Lu et al. | |
| 2010/0218158 | A1 | 8/2010 | Chow et al. | |

* cited by examiner

*Primary Examiner* — Binh Tat
(74) *Attorney, Agent, or Firm* — Seed IP Law Group PLLC (57) ABSTRACT

The disclosure relates to a method of fabricating an integrated circuit on a semiconductor chip, the method comprising: designing an architecture of the integrated circuit comprising at least first and second standard cells implementing a same basic function; designing for the standard cell at least first and second cell layouts presenting random differences; designing an integrated circuit layout corresponding to the integrated circuit architecture; fabricating the integrated circuit according to the integrated circuit layout; using the first cell layout to implement the first standard cell in the integrated circuit layout; and using the second cell layout to implement the second standard cell in the integrated circuit layout. The method can be used for protection of an integrated circuit against reverse engineering.

24 Claims, 8 Drawing Sheets

METHOD OF FABRICATING AN INTEGRATED CIRCUIT PROTECTED AGAINST REVERSE ENGINEERING

BACKGROUND

1. Technical Field

The present disclosure relates to a method of fabricating an integrated circuit on a semiconductor chip. In particular, the disclosure relates to a method comprising steps of designing an architecture of an integrated circuit comprising at least first and second standard cells implementing a same basic function, designing an integrated circuit layout corresponding to the integrated circuit architecture, and fabricating the integrated circuit according to the integrated circuit layout.

2. Description of the Related Art

Different techniques are known to design and fabricate integrated circuits. The most commonly used technique in the industry is the so-called "cell-based method", according to which an integrated circuit is seen as a combination of "standard cells", typically comprising one or more transistors, each implementing a basic function. A standard cell may be a logic gate, a memory cell, or may implement a more complex function (flip-flop, adder, multiplexor, etc.). In general, a standard cell comprises the following information: a functional description of the basic function (such as a truth table); a transistor netlist detailing the cell inputs, outputs, and connections between transistors; and a two-dimensional topographic view or "layout" of the cell as it will be fabricated.

The layout of a standard cell comprises a plurality of polygons of different materials (doped silicon, polysilicon, metal, etc.) situated on different levels and interconnections therebetween. The functioning of the cell is defined by the relative arrangement of the polygons and their interactions. Such a cell layout is designed so that the cell may be reliably fabricated yet still meet performance requirements such as size and speed. Design rules typically define the minimum dimensions of and the spacings between polygons on a same level, as well as the overlap between polygons situated on different levels (corresponding to the thickness of a dielectric layer separating the polygons arranged on different levels). A set of design rules is generally specific to a determined semiconductor fabrication process. Once a standard cell has been designed, it is stored in a cell library. For a given basic function, the library may comprise two or more standard cell layouts, each optimized for different parameters such as area, power consumption and speed.

Therefore, when an integrated circuit architecture has been designed, the corresponding integrated circuit layout is then generated by selecting from the library the standard cells corresponding to the different basic functions, for each basic function that the IC comprises. In some cases, two or more layouts are available for a given basic function, each layout corresponding to a specific set of parameters, for instance one wherein the cell area is optimized, another wherein the speed is optimized, and another wherein the power consumption is optimized. In that case, one cell layout is chosen depending on the desired set of parameters and is used for all instances of the basic function. The cell layouts are placed in rows and their inputs and outputs are routed using a chip netlist defining the interconnections between the different cells.

Reverse engineering is commonly used to find out how an integrated circuit was fabricated, how it works, and the data it contains. In order to reverse engineer an integrated circuit, a library of the different standard cell layouts present in the integrated circuit is first built. The repetition of standard cells greatly reduces the amount of time and effort needed to identify the cell layouts. For example, for an integrated circuit comprising 100,000 cells involving 100 different standard cells, the reverse engineer only has to identify the layout of the 100 different standard cells. Then, an automatic pattern recognition method is used to identify repeat instances of the same cell layout, find the interconnections between the standard cells, and discover the functionalities of the integrated circuit.

U.S. Pat. No. 6,064,110 discloses a method for protecting an integrated circuit from reverse engineering techniques using automatic pattern recognition by designing each cell with a common layout, whatever the basic function implemented by the cell layout. The common layout comprises operative and non-operative connections within and between transistors, signal inputs, and signal outputs. For example, a NAND cell and a NOR cell have the same layout, each comprising PMOS transistors and NMOS transistors and the same apparent interconnections between the transistors. Automatic pattern recognition of the basic functions is thus prevented and the reverse engineer is forced to do a cross-sectional view of each transistor to identify its operative and non-operative connections, and thereby determine the actual basic function implemented by the cell.

However, making all the cells similar, as well as accommodating the operative and non-operative interconnections, has an impact on the timing properties and/or size of the cell, rendering the cell slower and/or larger in terms of surface area occupied. Furthermore, the non-operative interconnections, implemented by implants of opposite dopants, are not compatible with some fabrication technologies using salicides to create metal polygons on the active polygons.

It may be desired therefore to provide an alternate method of fabricating an integrated circuit that offers security against reverse engineering using automatic pattern recognition.

BRIEF SUMMARY

Embodiments of the disclosure relate to a method fabricating an integrated circuit on a semiconductor chip, the method comprising: designing an architecture of the integrated circuit comprising at least first and second standard cells implementing a same basic function, designing an integrated circuit layout corresponding to the integrated circuit architecture, fabricating the integrated circuit according to the integrated circuit layout, the method further comprising designing for the standard cell at least first and second cell layouts presenting random differences, using the first cell layout to implement the first standard cell in the integrated circuit layout, and using the second cell layout to implement the second standard cell in the integrated circuit layout.

In one embodiment, the first and second cells as implemented with the first and second layouts have the same electrical properties.

In one embodiment, the first and second cell layouts are designed so that only one or more static nodes of the cell present different layouts with random differences.

In one embodiment, the method comprises designing a plurality of cell layouts for the basic function, each cell layout presenting random differences with respect to the other cell layouts, storing the plurality of cell layouts in a library, randomly selecting a first cell layout in the library and using the first randomly selected cell layout to implement the first standard cell in the integrated circuit layout, and randomly selecting a second cell layout in the library and using the second randomly selected cell layout to implement the second standard cell in the integrated circuit layout.

In one embodiment, the method comprises using the same random cell layout at least twice to implement the first standard cell if the number of instances of the first standard cell is greater than the number of cell layouts available to implement the first standard cell in the integrated circuit layout.

In one embodiment, the method comprises designing a cell layout for the basic function, randomly altering the cell layout when it is about to be placed in the integrated circuit layout so as to implement the first standard cell, and using the first randomly altered cell layout to implement the first standard cell, and randomly altering the standard cell layout when it is about to be placed in the integrated circuit layout so as to implement the second standard cell, and using the second randomly altered cell layout to implement the second standard cell.

In one embodiment, the method comprises designing a cell layout for the basic function, using the cell layout to implement first and second standard cells in the integrated circuit layout, then randomly altering the cell layout of at least one of the first and second standard cells.

In one embodiment, the method comprises defining a standard cell layout for the first and second standard cells, defining at least one customization parameter for at least one structural element of the standard cell layout, and randomly varying the customization parameter to design at least a second cell layout presenting random differences with respect to the standard cell layout.

In one embodiment, the structural element is chosen in the group consisting of a doped silicon polygon, a polysilicon polygon, a metal polygon, and an interconnection between two polygons.

In one embodiment, the customization parameter is the length of a polygon, the width of a polygon, the shape of a polygon, the distance between two polygons, the location of an interconnection, or the distance between two interconnections.

In one embodiment, the method comprises defining lower and upper limits of the customization parameter, and selecting a random value of the customization parameter within the lower and upper limits.

In one embodiment, the method comprises calculating a maximum area, using design rules, for a standard cell layout, dividing the maximum area into several surface units, generating a random number, generating an additional structural element the surface of which includes a number of units equal to the generated random number, and incorporating the additional structural element in the standard cell layout, in the area defined by the maximum area.

In one embodiment, the method comprises defining, in the architecture of the integrated circuit, at least one area to be protected against reverse engineering and at least one area not to be protected against reverse engineering, using different cell layouts presenting random differences to implement several instances of a standard cell in the area of the integrated circuit layout to be protected, and using the same cell layout to implement several instances of a standard cell in the area of the integrated circuit layout not to be protected.

Embodiments of the disclosure also relate to an integrated circuit on a semiconductor chip, comprising at least two interconnected standard cells implementing a same basic function, the interconnected standard cells having different layouts.

In one embodiment, the interconnected standard cells have the same speed and power consumption properties.

BRIEF DESCRIPTION OF THE SEVERAL VIEWS OF THE DRAWINGS

Embodiments of the present disclosure will now be described in connection with, but not limited to, the appended drawings in which.

DETAILED DESCRIPTION

Embodiments of the disclosure relate to a method of fabricating an integrated circuit protected against reverse engineering. The integrated circuit comprises one or more basic functions. A basic function is implemented as a standard cell comprising a functional description of the cell, a transistor netlist, and a layout. The cell layout comprises a plurality of polygons. The functioning of the cell is defined by the relative arrangement of the polygons and the interactions therebetween. For example, a transistor can be formed by the intersection of an active polygon and a polysilicon polygon. The active polygon is a P or N doped region of silicon used to implement the P or N channel between a transistor source and drain, and the polysilicon polygon forms a transistor gate.

According to embodiments of the disclosure, a plurality of different layouts is provided to implement a same basic function. When the basic function is implemented, one of the different layouts is randomly selected or generated. An automatic pattern recognition method for identifying the basic function of a cell layout is thus prevented.

In the following description, the following references will be used:

"Fi" designates a basic function of rank i, with i from 1 to M; M being the total number of discrete basic functions implemented within a considered integrated circuit;

"Lij" designates a layout of rank j for a basic function Fi, with j from 1 to N; N being the total number of layouts generated for the given basic function Fi; and "Ck" designates a cell of rank k within an integrated circuit architecture or an integrated circuit layout, with k from 1 to T; T being the total number of cells within the integrated circuit.

Figure 1:
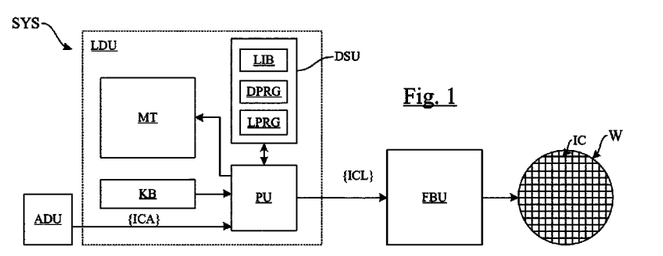
FIG. 1 shows a system for fabricating an integrated circuit according to embodiments of the disclosure.

FIG. 1 shows an embodiment of a system SYS for fabricating ICs according to the disclosure. The system comprises an IC architecture design unit ADU, an IC layout design unit LDU, and an IC fabrication unit FBU.

The design unit ADU is provided to design an integrated circuit architecture ICA. Once designed, the architecture ICA comprises a plurality of basic functions Fi. The architecture ICA is supplied as a file {ICA} to the layout design unit LDU.

The layout design unit LDU comprises a keyboard KB, a display monitor MT, a processing unit PU, and a data storage unit DSU. The data storage unit DSU stores a design program DPRG, a circuit layout program LPRG, and a library LIB. The design program DPRG is configured to design cell layouts, each implementing a basic function Fi. The library LIB comprises sub-libraries SLi, for example one per basic function Fi. Each sub-library stores one or more cell layouts Lij as well a functional description of the behavior of the cell and a transistor netlist detailing the cell inputs and outputs.

The layout program LPRG is configured to design, by means of the library LIB, an integrated circuit layout ICL corresponding to an IC architecture ICA. The integrated circuit layout ICL is then supplied to the fabrication unit in the form of a file {ICL}.

The fabrication unit FBU comprises different types of equipment implementing different steps of the fabrication process, for example photomask fabrication, photoresist deposit and exposure, ion implantation, etc. At the end of the fabrication process, a semiconductor wafer W comprising a plurality of integrated circuits IC is produced, each IC implementing the integrated circuit architecture ICA.

Figure 2:
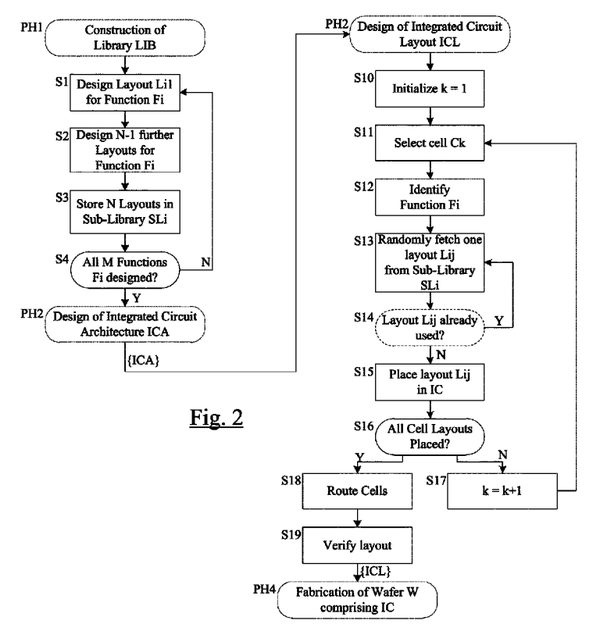
FIG. 2 shows a process of fabricating an integrated circuit according to a first embodiment of the disclosure.

FIG. 2 is a flow chart illustrating a fabrication process according to a first embodiment of the disclosure. The process comprises a library construction phase PH1, an IC architecture design phase PH2, an IC layout design phase PH3, and an IC fabrication phase PH4. It is to be appreciated that this fabrication process is performed for a given technology node (such as the 65 nm, 45 nm, 32 nm . . . nodes, which are defined as the half-pitch of a memory cell) and for a given semiconductor fabrication technology.

The library construction phase PH1 is carried out by a design engineer using the layout design unit LDU, and comprises steps S1-S4 of designing a plurality of layouts Lij for each basic function Fi. Phase PH1 is performed with the aid of the design program DPRG. The design program DPRG is a computer-aided design program implementing design rules, which typically define the minimum dimensions of the various polygons that the cell layout comprises, as well as the spacings therebetween.

In step S1, a first basic function Fi is selected and a first layout Li1 of the basic function Fi is designed by the engineer. In step S2, N−1 further layouts Li2-LiN are designed, either by the engineer or by the design program DPRG by randomly varying the layout Li1 while respecting the design rules. In step S3, the N layouts Li1-LiN are stored in a corresponding sub-library SLi, together with a functional description of the basic function Fi and a transistor netlist. In step S4, the engineer or the design program verifies whether all M basic functions Fi have been designed. If the response is no, steps S1-S3 are repeated until phase PH1 is completed. If the response is yes, phase PH1 is completed.

The integrated circuit architecture design phase PH2 comprises steps (not shown) of designing an integrated circuit architecture ICA. The integrated circuit architecture comprises T cells Ck (C1 to CT), implementing M basic functions Fi, M being less than T. An integrated architecture file {ICA} is then supplied to the layout design unit LDU.

Next, the layout phase PH3 is implemented. In this phase, which comprises steps S10-S19, the integrated circuit architecture ICA is transformed into an integrated circuit layout ICL comprising T cell layouts Lij. In step S10, the layout program LPRG is initialized with k=1. In step S11, the layout program selects the corresponding cell Ck in the integrated circuit architecture. In step S12, the layout program identifies the function Fi of cell Ck. In step S13, the layout program randomly selects one of the N available layouts Lij stored in the corresponding sub-library SLi in library LIB.

In step S14, the layout program verifies whether the selected layout Lij has already been used. If the response is yes, the layout program returns to step S13 and fetches another layout from the sub-library SLi. If the response is no, the layout program continues to step S15, during which the selected layout Lij is placed in the integrated circuit layout.

In step S16, the layout program verifies whether the placement of the cell layouts in the integrated circuit layout is completed. If the response is no, the layout program goes to step S17, where it increments the value of k, and then returns to step S11, where it selects the corresponding cell Ck. If the response is yes, the layout program goes to step S18 where it routes the placed cell layouts, such as by using the transistor netlist information stored in the library LIB. In step S19, the layout program verifies the correct functioning of the integrated circuit layout ICL.

The integrated circuit layout ICL is then supplied to the fabrication unit FBU in the form of a file {ICL}. The fabrication phase PH4 is then performed to fabricate one or more wafers W comprising integrated circuits IC. The fabrication phase comprises steps (not detailed) according to well-known microelectronic processes. The wafer W may be then cut into individual integrated circuit IC chips.

It is to be appreciated that step S14 is optional. The layout program may fetch and place a layout Lij in the integrated circuit layout without considering whether the same layout has already been used. Alternatively, the fetch step S13 may comprise a step of preventing the same layout from being used more than once, such as by setting a flag associated with the layout.

Conversely, the integrated circuit architecture may comprise more instances of a basic function Fi than the greatest number N of varied layouts possible for that function. For example, if a basic function F1 is implemented 100 times in the IC architecture and only 90 layouts are available, the layout program may reuse some layouts for at least ten cell instances of F1. The implementation programs as described above in relation with FIG. 2 may therefore comprise additional steps, such as verifying the total number of instances of a basic function, comparing it with the number N of layouts for that basic function, and allowing one or more layouts to be reused.

It should also be appreciated that the number N of different layouts per basic function Fi is not necessarily the same for each basic function. Furthermore, the implementation of the layout phase may be varied. For example, instead of proceeding cell by cell, the layout program may search for and layout all instances of a first basic function, then proceed to a second basic function, etc. It should also be appreciated that phases PH1 and PH2 may be performed in reverse order. That is to say, the integrated architecture ICA may first be designed, and then the library LIB may be constructed to implement said architecture. Furthermore, the library construction phase PH1 does not have to be performed every time the integrated circuit fabrication process is implemented. Once the library is designed, it may be used again for different integrated circuit architectures.

Figure 3:
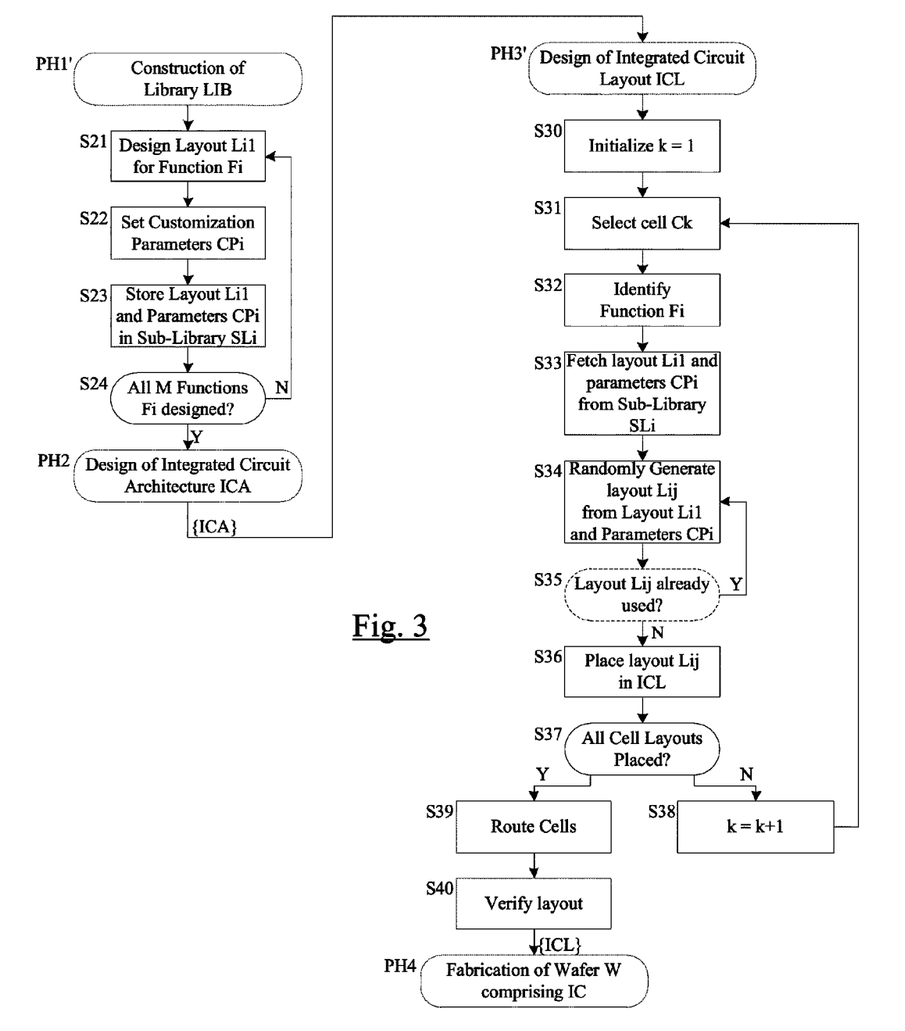
FIG. 3 shows a process of fabricating an integrated circuit according to a second embodiment of the disclosure.

FIG. 3 is a flow chart illustrating a fabrication process according to a second embodiment of the disclosure. The process comprises a library construction phase PH1', the IC architecture design phase PH2 previously described, an IC layout phase PH3', and the IC fabrication phase PH4 previously described.

The library construction phase PH1' comprises steps S21-S24 of designing a first layout Li1 and defining "customization parameters" CPi for each basic function Fi. The customization parameters are layout parameters that can be varied when a cell layout of a basic function is generated. These parameters may be defined by the design engineer, or may be automatically determined by the design program DPRG.

In step S21, a first basic function Fi is selected and a first layout Li1 of the basic function Fi is designed by the engineer. In step S22, the customization parameters CPi are defined for the layout Li1, either by the engineer or by design program DPRG. In step S23, the first layout Li1 and the customization parameters CPi are stored in a corresponding sub-library SLi. In step S24, the engineer or the design program verifies whether all M basic functions Fi have been designed. If the response is no, steps S21-S23 are repeated until phase PH1' is completed. If the response is yes, phase PH1' is completed.

An integrated circuit architecture ICA is then designed during phase PH2, as described above. The integrated circuit architecture ICA comprises T cells Ck (C1 to CT), implementing M basic functions Fi. The integrated architecture {ICA} is then supplied to the layout design unit LDU.

Next, the layout phase PH3' is implemented. In this phase, which comprises steps S30-S40, the integrated circuit architecture ICA is transformed into an integrated circuit layout ICL comprising a plurality of cell layouts Lij. In step S30, the layout program LPRG is initialized with k=1. In step S31, the layout program selects the corresponding cell Ck in the integrated circuit architecture. In step S32, the layout program identifies the function Fi of cell Ck. In step S33, the layout program goes to the corresponding sub-library SLi in the library LIB and selects layout Li1 and the customization parameters CPi stored in sub-library SLi.

In step S34, the layout program randomly generates another layout Lij from the fetched layout Li1 and the customization parameters CPi. In step S35, the program verifies whether the generated layout Lij has already been generated. If the response is yes, the layout program returns to step S34 and re-generates a varied layout Lij, and then verifies whether the newly generated layout was already generated. If the response is no, the layout program continues to step S36, during which the generated layout Lij is placed in the integrated circuit layout ICL.

In step S37, the layout program verifies whether the placement of cell layouts in the integrated circuit layout is completed. If the response is no, the layout program goes to step S38, where it increments the value of k, and then the layout program returns to step S31, where it selects the corresponding cell Ck. If the response is yes, the layout program goes to step S39 where it routes the placed cell layouts, such as by using the transistor netlist information stored in the library LIB. In step S40, the layout program verifies the correct functioning of the integrated circuit layout ICL.

The integrated circuit layout ICL is then supplied to the fabrication unit FBU in the form of a file {ICL}, and the fabrication phase PH4 is then performed as described above.

It is to be appreciated that step S35 is optional. As previously, the layout program may fetch and place a layout Lij in the integrated circuit layout without considering whether the same layout has already been used. Alternatively, the fetch step S33 may comprise a step of preventing the same layout from being generated more than once, such as by preventing the customization parameters CPi from being used in the same manner to generate a layout. Furthermore, the customization parameters CPi may be not stored in the library LIB or sub-libraries SLi themselves but in another data storage location associated with the library. Finally, the implementation steps and phases of the fabrication process may be implemented in a different order, and may comprise steps of verifying the total number of instances of a basic function and comparing it with the total number N of layouts Lij available for that function.

Referring to FIGS. 4, 5A to 5G, examples will now be given of cell layouts implementing the basic function F1. These layouts are given for illustrative purposes only to show a few possibilities of the alternate layouts that may be implemented by the skilled person. It will be understood by the skilled person that more layouts of basic function F1 are possible, as well as other means of altering a cell layout.

Figure 4:
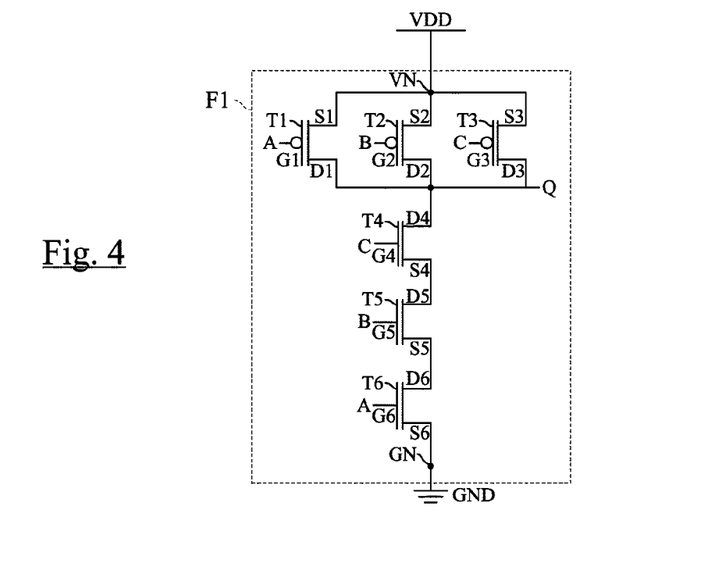
FIG. 4 shows a circuit diagram of a basic function of an integrated circuit.

FIG. 4 is a circuit diagram of a first basic function F1, here a three-input NAND gate. The circuit diagram comprises three PMOS transistors T1, T2, T3 connected in parallel and three NMOS transistors T4, T5, T6 connected in series. Each transistor T1 to T6 comprises a source S1 to S6 respectively, a gate G1 to G6 respectively, and a drain D1 to D6 respectively. An input A is electrically linked to gates G1, G6; an input B is electrically linked to gates G2, G5; and an input C is electrically linked to gates G3, G4. Sources S1, S2, S3 are connected to a voltage node VN to receive a voltage supply VDD, and drains D1, D2, D3 are connected to an output node Q. Source S6 is connected to a ground node GN. Source S5 is connected to drain D6, source S4 is connected to drain D5, and drain D4 is connected to the output node Q.

FIGS. 5A to 5G respectively show cell layouts L11, L12, L13, L14, L15, L16, L17 of basic function F1. These layouts differ from one another by variations of the customization parameters, which correspond to modifications made to the initial layout. The customization parameters include, but are not limited to, the following: parameters defining the polygon geometries and the number and the nature of polygons (polysilicon, metal, and/or active polygons), the location and number of interconnections, the distance between polygons, the overlap between polygons of different levels.

Figure 5A:
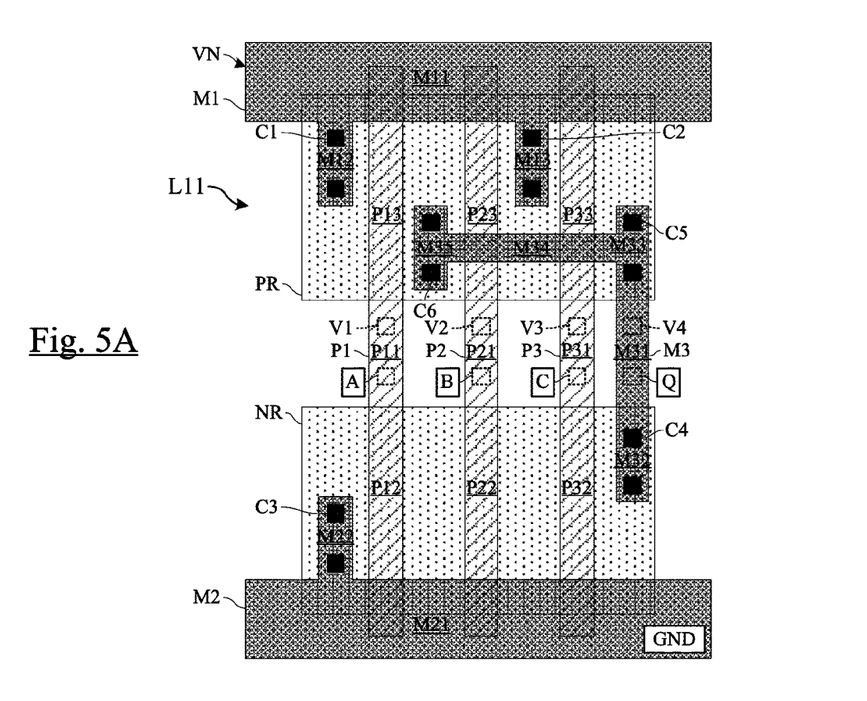
FIGS. 5A to 5G show different cell layouts each implementing the basic function of FIG. 4.

Layout L11, shown in FIG. 5A, comprises an active polygon PR formed by a P doped silicon region, an active polygon NR formed by an N doped silicon region, three polysilicon polygons P1, P2, P3, and three metal polygons M1, M2, M3. The active polygons PR, NR are within a first plane, the polysilicon polygons P1, P2, P3 are within a second plane above the first plane, and the metal polygons M1, M2, M3 are within a third plane above the second plane. The first, second, and third planes are separated from each by dielectric layers, not shown.

The polygons PR, NR of doped silicon have rectangular shapes and are arranged side-by-side vertically and a separated by an undoped region of silicon. Polygons P1, P2, P3 also have rectangular shapes and are arranged vertically next to each other. Each polysilicon polygon P1, P2, P3 comprises respectively a central region P11, P21, P31 that extends above the undoped region separating the polygons PR, NR, a first end region P12, P22, P32 extending above the polygon NR, and a second end region P13, P23, P33 extending above the polygon PR.

The metal polygon M1 comprises a first rectangular region M11 extending horizontally above the end regions P13, P23, P33, and two rectangular regions M12, M13 extending vertically. The region M12 extends parallel to the end region P13, to the left thereof, and is electrically linked to the polygon PR by means of interconnections C1 traversing the dielectric layer. The region M13 extends between the end regions P23, P33, parallel thereto, and is electrically linked to the polygon PR by means of interconnections C2 traversing the dielectric layer.

The metal polygon M2 comprises a first rectangular region M21 extending horizontally above the end regions P12, P22, P32, and a rectangular region M22 extending vertically. The region M22 extends parallel to the end region P12, to the left thereof, and is electrically linked to the polygon NR by means of interconnections C3 traversing the dielectric layer.

The metal polygon M3 comprises a first rectangular vertical region comprising a central region M31 and two end regions M32, M33. It further comprises a horizontal region M34 and a second vertical region M35 parallel to the central region M31.

The central region M31 extends above the undoped silicon region separating the polygons PR and PN. The end region M32 extends above the polygon NR, and is electrically linked to the polygon NR by means of interconnections C4 traversing a dielectric layer. The end region M33 extends above the polygon PR, and is electrically linked to the polygon PR by means of interconnections C5 traversing the dielectric layer. The region M34 links the regions M33 and M35 and crosses over the regions P23, P33 of polygons P2, P3. The region M35 extends between the regions P13, P23 of polygons P1, P2 and is electrically linked to polygon PR by means of interconnections C6 traversing the dielectric layer.

The inputs A, B, C of the basic function are respectively formed by interconnections V1, V2, V3 which traverse a higher dielectric layer (not shown) to connect the central regions P11, P21, P31 of polygons P1, P2, P3 to higher electrical conductors, also not shown. The output Q is formed by an interconnection V4 that traverses the higher dielectric layer to connect the central region M31 of polygon M3 to a higher electrical conductor.

On the electrical level, polygon PR forms P channels between sources S1 to S3 and the drains D1 to D3 respectively, and polygon NR forms N channels between sources S4 to S6 and drains D4 to D6 respectively. Polysilicon regions P13, P23, P33, P32, P22, P12 form the gates G1, G2, G3, G4, G5, G6 respectively. Metal polygon M1 forms the voltage node VN, and metal polygon M2 forms the ground node GN.

Figure 5B:
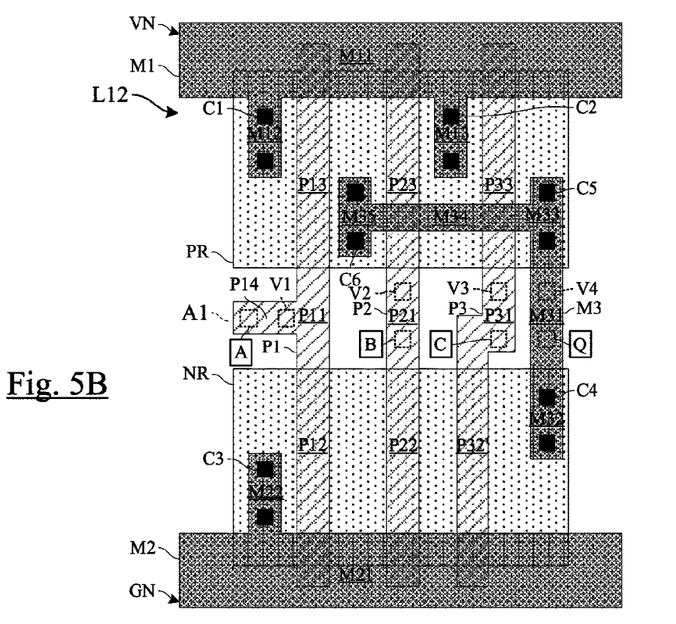

In FIG. 5B, layout L12 differs from layout L11 in that a horizontal extension P14 has been added to the central region P11 of polygon P1, and interconnections V1 have been moved onto this extension P14. In addition, the shape of polygon P3 has been modified by shifting the first end region in one direction to form an end region P32', replacing the initial end region P32, and which is no longer aligned with the central region P31 and the end region P33.

Figure 5C:
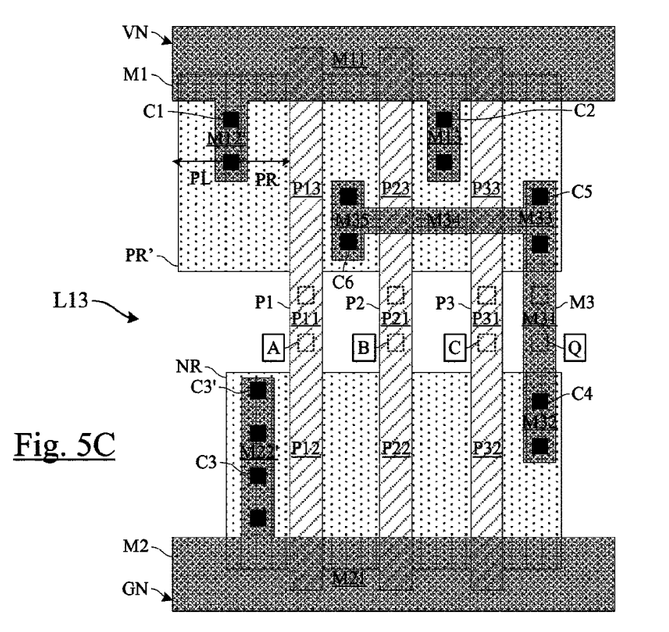

In FIG. 5C, layout L13 differs from layout L11 in that the size of the initial P doped polygon PR has been increased to form a polygon PR'. In addition, the interconnections C1 and the vertical region M12 upon which the interconnections C1 are located have been shifted in one direction. The amount of shift may be implemented by defining the lower and upper limits of the corresponding customization parameters, and by selecting random values of the parameters within the lower and upper limits of the parameters. For example, a parameter PL is defined for the distance between the center of interconnection C1 and the left border of the cell layout L13, and a parameter PR is defined for the distance between the center of the interconnection C1 and the edge of polysilicon polygon P1. The placement of the interconnection C1 may be thus varied by varying the parameters PL, PR. Furthermore, one or more extra or 'redundant' interconnections C3' have been added and the metal region upon which they are situated has been extended to obtain a larger metal region M32' comprising interconnections C3 and C3'.

Figure 5D:
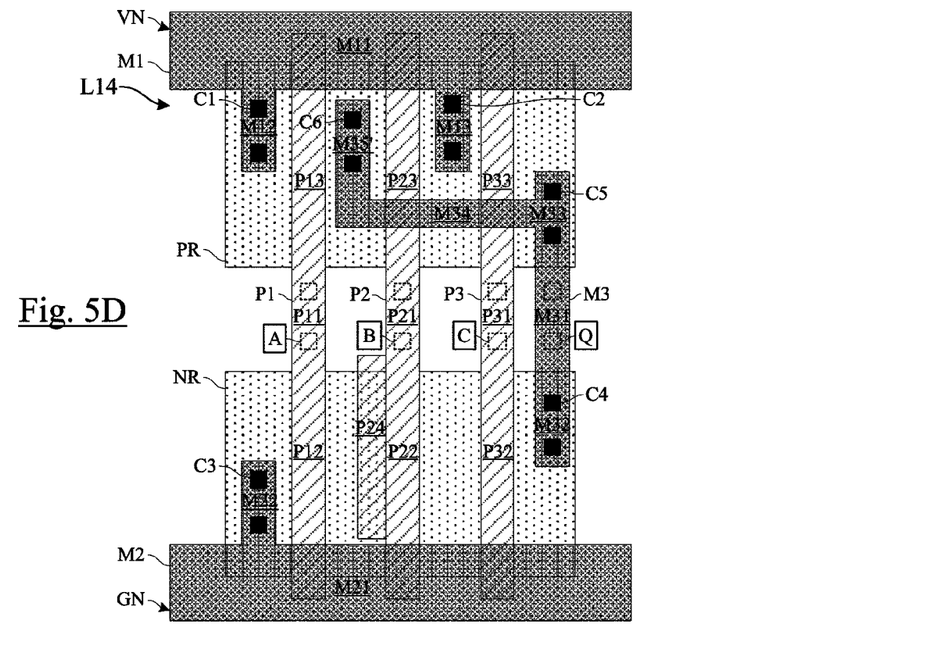

In FIG. 5D, layout L14 differs from layout L11 in that the initial vertical region M35 has been vertically shifted with respect to region M34 to form a new vertical region M35'. Consequently, the interconnections C6 have also been shifted vertically. In addition, a polysilicon polygon P24 has been added on one side of the polygon P2.

Figure 5E:
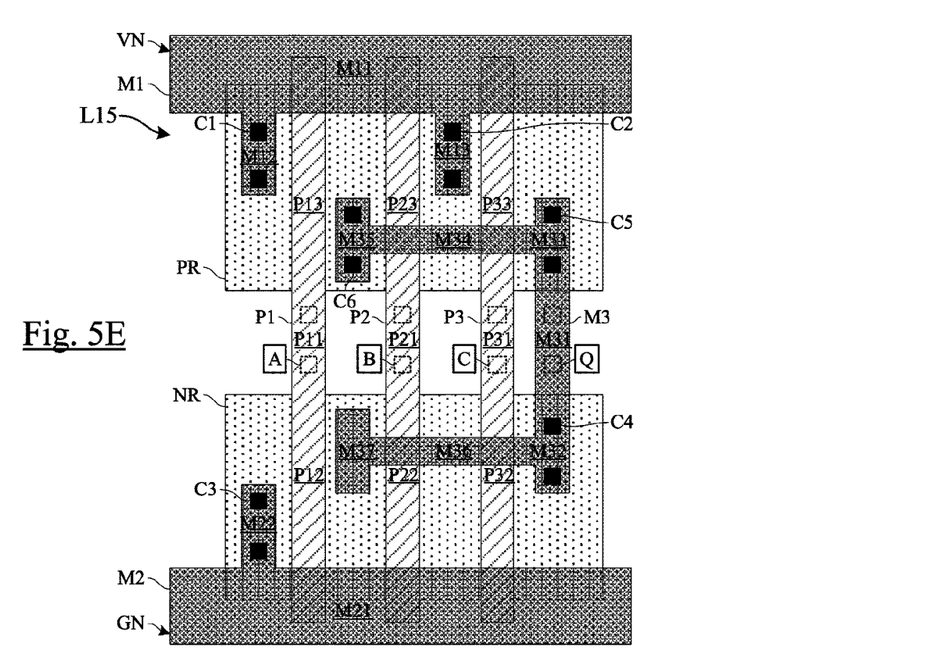

In FIG. 5E, layout L15 differs from layout L11 in that the sizes of the initial N and P polygons PR, NR have been increased to form new polygons PR', NR'. In addition, the metal polygon M3 has been modified so that it further comprises a horizontal region M36 and a third vertical region M37, parallel to the region M31. The region M36 links the regions M32 and M37, crosses over the regions P22, P32 of polygons P2, P3, and is parallel to region M34. The region M37 extends between the regions P12, P22 of polygons P1, P2 but comprises no interconnections to the active polygon NR. Metal regions M36, M37 thus form dummy metal regions, with no actual interconnect function.

Figure 5F:
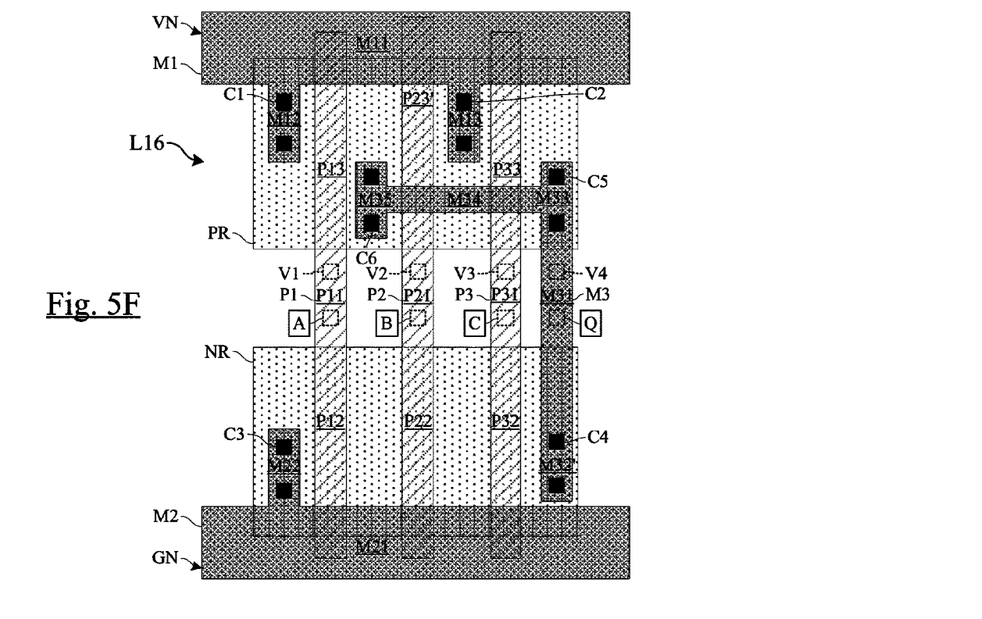

In FIG. 5F, layout L16 differs from layout L11 in that the end region P23 extending over the polygon PR has been extended to form an extended region P23'. In addition, the end region M32 has been vertically extended towards the metal polygon M2 to form an extended end region M32'. The interconnections C4 have also been shifted towards the metal polygon M2.

Figure 5G:
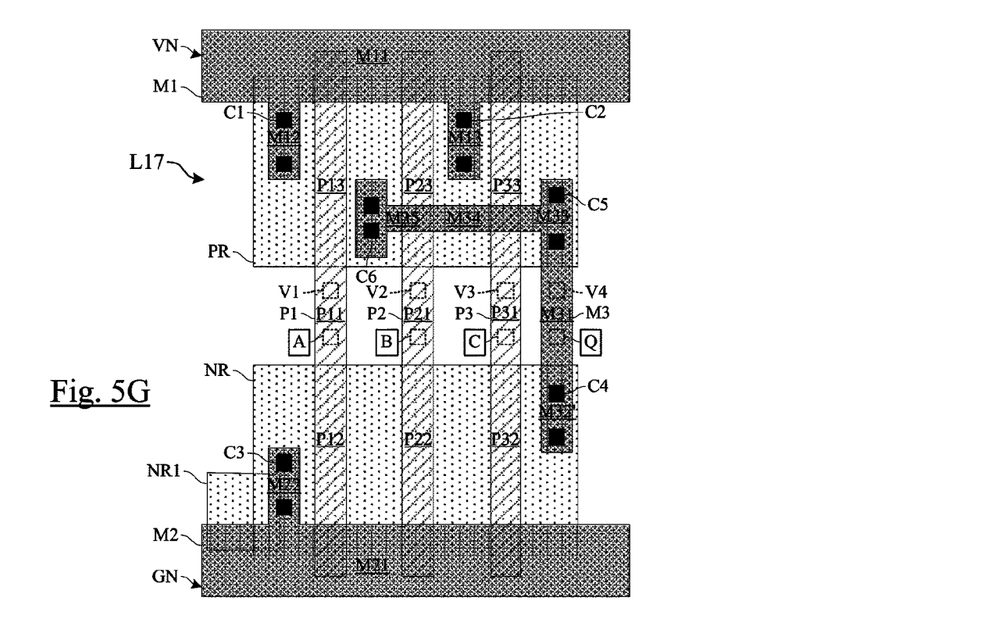

In FIG. 5G, layout L17 differs from layout L11 in that the distance between the interconnections C6 has been reduced. An active polygon NR1 of N doped material has also been added in a suitable region of the layout, here slightly overlapping one corner of the polygon NR.

It is to be appreciated that in FIGS. 5A to 5G the different planes of layouts L11 to L17 are shown superimposed and in transparency for a better conceptual view of the cell layout. However, once the integrated circuit is fabricated only one layer is visible at a time when the integrated circuit is being stripped and imaged layer-by-layer. Therefore, while the functions of the above layouts appear evident when the layers are shown in a superimposed and transparent manner, it is not the case when only one layer is visible at a time. For someone to reverse engineer the integrated circuit and determine the function of the cell, each layer would have to be stripped, imaged, and compared with the other layers, which is a time-consuming process that would thus be repeated for every cell.

Figures 6, 7:
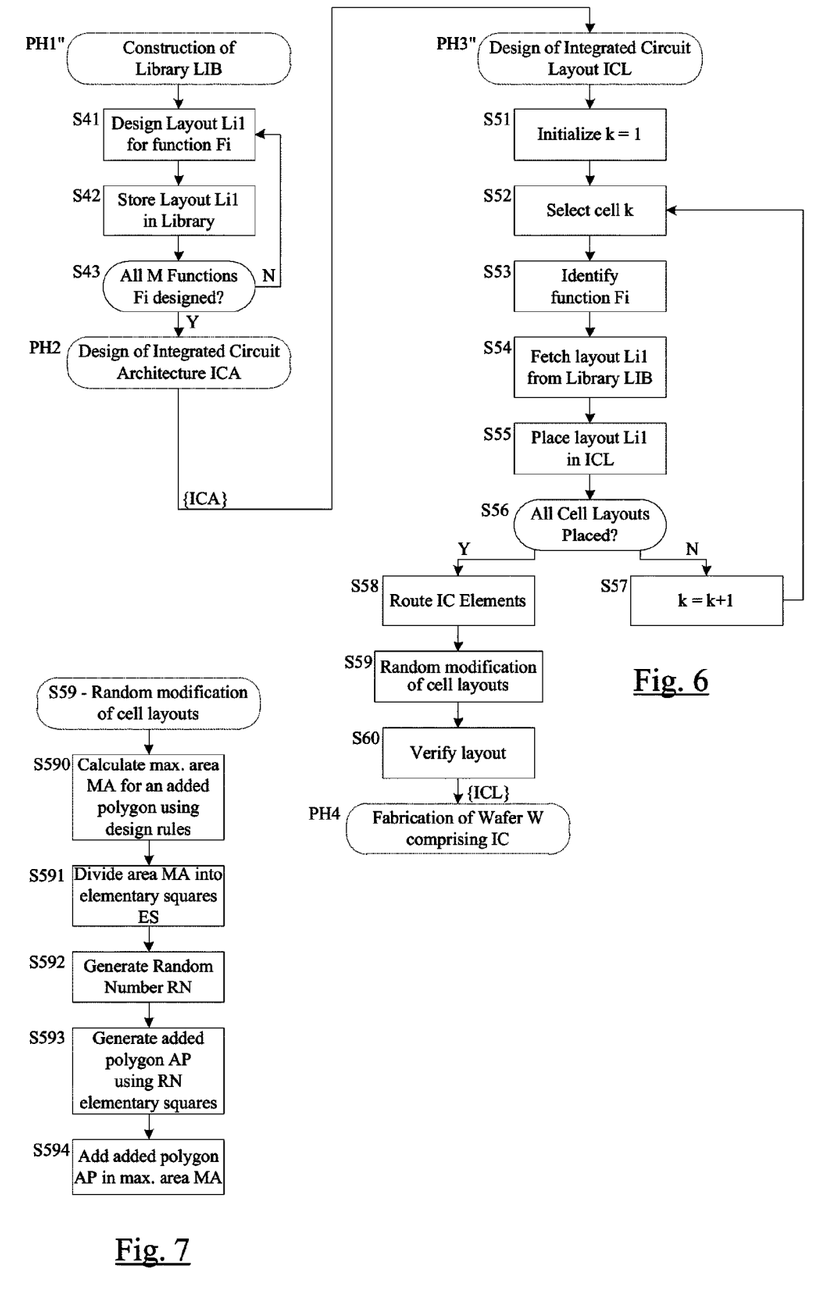
FIGS. 6 and 7 show a process of fabricating an integrated circuit according to a third embodiment of the disclosure.

FIG. 6 is a flow chart illustrating a fabrication process according to a third embodiment of the disclosure. The process comprises a library construction phase PH1", the IC architecture design phase PH2 previously described, an IC layout phase PH3", and the IC fabrication phase PH4 previously described.

The library construction phase PH1" comprises steps S41-S43 of designing a first layout Li1 for each basic function Fi. In step S41, a first basic function Fi is selected and a first layout Li1 of the basic function Fi is designed by the engineer. In step S42, the layout Li1 is stored in the library LIB. In step S43, the engineer or the design program DPRG verifies whether all M basic functions Fi have been designed. If the response is no, steps S41 and S42 are repeated until phase PH1" is completed. If the response is yes, the phase PH1" is completed. The constructed library thus comprises one or more layouts Li1, at least one per basic function Fi.

An integrated circuit architecture ICA is then designed during phase PH2, as described above. The integrated circuit architecture ICA comprises T cells Ck (C1 to CT), implementing M basic functions Fi. The integrated architecture {ICA} is then supplied to the layout design unit LDU.

Next, the layout phase PH3" is implemented. In this phase, which comprises steps S51-S60, the integrated circuit architecture ICA is transformed into an integrated circuit layout ICL comprising a plurality of cell layouts Lij. In step S51, the layout program LPRG is initialized with k=1. In step S52, the layout program selects the corresponding cell Ck. In step S53, the layout program identifies the function Fi of cell Ck. In step S54, the layout program selects the corresponding layout Li1 stored in the library. In step S55, the selected layout Li1 is placed in the integrated circuit layout ICL.

In step S56, the layout program LPRG verifies whether the placement of cell layouts in the integrated circuit layout is completed. If the response is no, the layout program goes to step S56, where it increments the value of k, and then the layout program returns to step S52, where it selects the corresponding cell Ck. If the response is yes, the layout program goes to step S58, where it routes the placed cell layouts, such as by using the transistor netlist information stored in the library LIB.

In step S59, the layout program LPRG randomly varies the layout of cell layouts preferably while respecting the design rules. This step may be implemented using a randomization program RPRG which may be a subroutine of the layout program LPRG. For example, the randomization program may determine the size and placement of polygons to be added depending on the available space between polygons, calculate which polygons may be shifted, determine where further interconnections may be added, etc. in accordance with parameters that will be disclosed in further detail below. This randomization program may be done in a cell-by-cell manner, globally for the entire integrated circuit layout, or only for regions thereof.

In step S60, the layout program verifies the correct functioning of the integrated circuit layout ICL.

The integrated circuit layout ICL is then supplied to the fabrication unit FBU in the form of a file {ICL}, and the fabrication phase PH4 is then performed as described above.

In one variant of this third embodiment of a fabrication process according to the disclosure, the library LIB is identical to a conventional integrated circuit standard cell library, phases PH1", PH2 are conventional, and phase PH3" only differs from a conventional layout design phase in that step S59 is provided.

FIG. 7 is a flow chart illustrating one embodiment of step S59. Step S59 comprises steps S590-S594. In step S590, the randomization program RPRG calculates, for a given region of the integrated circuit layout and a given polygon material (such as active, polysilicon, metal, etc) a maximum area MA of a polygon that can be added of the given material. This maximum area may be calculated using the design rules. In step S591, the randomization program divides the calculated maximum area MA into a plurality of elementary squares ES. The size of these elementary squares may be defined for example by the minimum feature size according to the photolithography process that will be used to fabricate the integrated circuit. In step S592, a random or pseudo-random number generator is used to generate a random or pseudo-random number RN. In step S593, the randomization program uses the generated random number RN to form an added polygon AP comprising the number RN of elementary squares ES. In step S594, the randomization program inserts the added polygon AP in the integrated circuit layout in the maximum area MA available. This process may be repeated.

Figure 8:
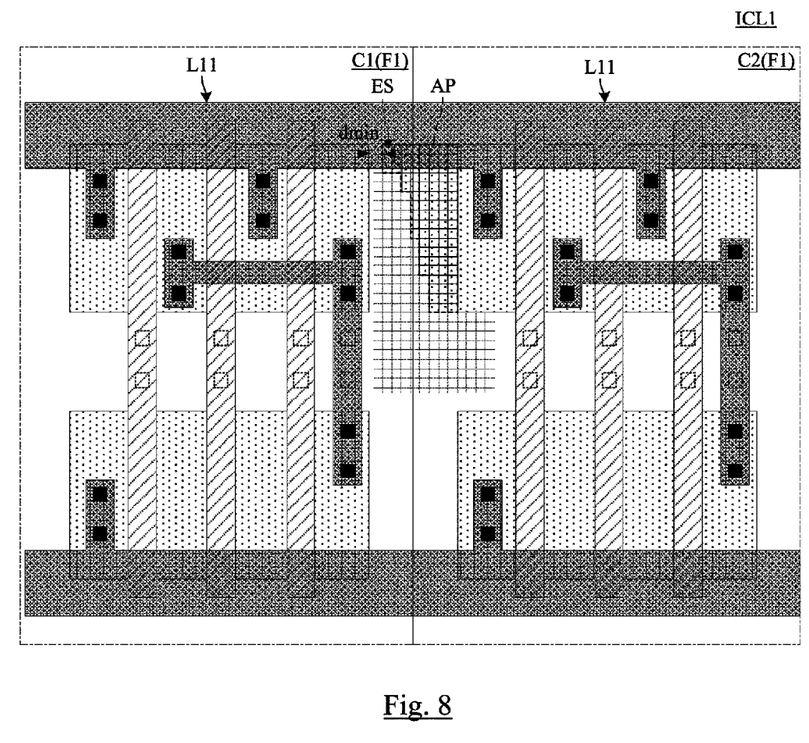
FIG. 8 shows an integrated circuit layout designed according to the process according to FIGS. 6 and 7.

FIG. 8 shows an integrated circuit layout ICL1 designed according to the process of FIGS. 6 and 7. Integrated circuit layout ICL1 comprises two cells, C1(F1) and C2(F1), implementing the same basic function F1. In accordance with step S54 of FIG. 4, the corresponding layouts L11 (shown in FIG. 5A) have been placed in each cell location.

In accordance with steps S590-S594, a maximum area for the addition of an active P doped polygon between the two cells has been calculated according to the design rules. For example, a design rule defining the minimum distance dmin between the active P doped polygon and other polygons is utilized to calculate the maximum area. Then, the maximum area is divided into a plurality of elementary squares ES, for example S elementary squares. A random or pseudo-random number RN from 0 to S is generated, and the random number is used to generate an additional polygon AP of active P doped material comprising RN elementary squares. The additional polygon AP is incorporated in the area between the cell layouts, and forms an extension of the active P polygon PR, thereby modifying the layout of the source terminal of C2 (power supply node).

The skilled person may implement different methods for the design of integrated circuit layouts. It is well known that different methods may be used for the layout of a cell, such as complementary MOS, pseudo-MOS, dynamic MOS, etc. The layouts shown in FIGS. 5A to 5G simply illustrate layouts using complimentary MOS technology (CMOS) with the voltage and ground sources horizontally arranged across the opposite sides of the cell layout. Additionally, some of the customization parameters described above may have an effect upon the electrical properties, such as the propagation time of a signal throughout the cell (corresponding to the switching time for a logic gate cell) and the dynamic and static power consumption of the cell.

In a preferred embodiment of the disclosure, the layouts of different instances of a same basic function are designed so that their electrical properties are the same while presenting random differences one with respect to the other. In particular, one practical embodiment of the disclosure in order not to alter the electrical properties of the initial layout in terms of speed and power consumption, only alters the static nodes of a cell, e.g. the power supply nodes and ground nodes, and does not alter its dynamic nodes (i.e. nodes through which the signal passes, such as input and output nodes, or intermediate data nodes between transistors). Static nodes include all polygons (active, polysilicon, metal) and vias through which the power supply is supplied to transistors, or through which transistors are linked to ground or any other static electrical potential.

Alternately, a selection may be made among a large ensemble of random layouts so as to only use those that have identical electrical properties. By "same electrical properties" it is meant that the percentage of variation of each considered electrical property (e.g. speed and/or power consumption) is less than 5% within the different instances of the basic function.

Furthermore, the skilled person may provide different methods as to how to perform the layout randomization process. In particular, the randomization process as described above may be implemented for only a portion of the integrated circuit. That is to say, it may be desired to improve the security against reverse-engineering of only a sensitive area of an IC, such as a critical data path. Accordingly, the other areas of the integrated circuit, such as interfaces, are less critical and therefore do not need to be secure.

In this case, the layout phase PH3, PH3', or PH3" may comprise steps of verifying whether the portion of the circuit to be laid-out needs to be secure or not. If not, the layout program may choose only the first layout Li1 for each function Fi, or only varied layouts that have identical electrical properties, or only layouts from a different cell library dedicated to non-secure portions. Moreover, it is clear that the different layout programs described above may be combined or their steps modified in order to carry out a randomization of the integrated circuit layout.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of fabricating an integrated circuit on a semiconductor chip, the method comprising:
designing an architecture of the integrated circuit, the architecture including first and second standard cells configured to implement a same basic function;
designing an integrated circuit layout corresponding to the integrated circuit architecture; and
fabricating the integrated circuit on the semiconductor chip according to the integrated circuit layout;
wherein designing the integrated circuit layout includes:
designing a preliminary cell layout for the basic function;
creating first and second cell layouts having at least one layout difference from each other;
using the first cell layout to implement the first standard cell in the integrated circuit layout; and
using the second cell layout to implement the second standard cell in the integrated circuit layout, wherein:
creating the first cell layout includes obtaining a first randomly altered cell layout by randomly altering the preliminary cell layout, and using the first randomly altered cell layout to implement the first standard cell; and
creating the second cell layout includes obtaining a second randomly altered cell layout by randomly altering the preliminary cell layout, and using the second randomly altered cell layout to implement the second standard cell.

2. A method according to claim 1, in which the first and second standard cells as implemented with the first and second layouts have the same electrical properties.

3. A method according to claim 1, in which the first and second cell layouts are designed so that the at least one layout difference consists of only one or more static nodes.

4. A method according to claim 1, wherein designing the integrated circuit layout uses a computer.

5. A method of fabricating an integrated circuit on a semiconductor chip, comprising:
designing an architecture of the integrated circuit, the architecture including first and second standard cells configured to implement a same basic function;
designing an integrated circuit layout corresponding to the integrated circuit architecture; and
fabricating the integrated circuit on the semiconductor chip according to the integrated circuit layout;
wherein designing the integrated circuit layout includes:
designing a plurality of cell layouts, including a first and second cell layouts for the basic function, each cell layout presenting differences with respect to the other cell layouts, first and second cell layouts having at least one layout difference from each other;
storing the plurality of cell layouts in a library;
randomly selecting the first cell layout in the library and using the randomly selected first cell layout to implement the first standard cell in the integrated circuit layout; and
randomly selecting the second cell layout in the library and using the randomly selected second cell layout to implement the second standard cell in the integrated circuit layout.

6. A method according to claim 5, comprising using the same cell layout at least twice to implement the first standard cell if the number of instances of the first standard cell is greater than the number of cell layouts available to implement the first standard cell in the integrated circuit layout.

7. A method of fabricating an integrated circuit on a semiconductor chip, comprising:
designing an architecture of the integrated circuit, the architecture including first and second standard cells configured to implement a same basic function;
designing an integrated circuit layout corresponding to the integrated circuit architecture; and
fabricating the integrated circuit on the semiconductor chip according to the integrated circuit layout;
wherein designing the integrated circuit layout includes:
creating a first cell layout;
using the first cell layout to implement the first and second standard cells in the integrated circuit layout;
randomly altering the first cell layout of the second standard cell to obtain a second cell layout, the first and second cell layouts having at least one layout difference from each other; and
using the second cell layout to implement the second standard cell in the integrated circuit layout.

8. A method of fabricating an integrated circuit on a semiconductor chip, comprising:
designing an architecture of the integrated circuit, the architecture including first and second standard cells configured to implement a same basic function;
designing an integrated circuit layout corresponding to the integrated circuit architecture; and
fabricating the integrated circuit on the semiconductor chip according to the integrated circuit layout;
wherein designing the integrated circuit layout includes:
defining a standard cell layout for the first and second standard cells;
defining at least one customization parameter for at least one structural element of the standard cell layout;
randomly varying the customization parameter of the standard cell layout to create at least one of first and second cell layouts, the first and second cell layouts having at least one layout difference from each other;
using the first cell layout to implement the first standard cell in the integrated circuit layout; and
using the second cell layout to implement the second standard cell in the integrated circuit layout.

9. A method according to claim 8, in which the structural element is chosen in the group consisting of a doped silicon polygon, a polysilicon polygon, a metal polygon, and an interconnection between two polygons.

10. A method according to claim 9, wherein the customization parameter is a length of a polygon, a width of a polygon, a shape of a polygon, a distance between two polygons, a location of an interconnection, or a distance between two interconnections.

11. A method according to claim 8, comprising:
defining lower and upper limits of the customization parameter; and
selecting a random value of the customization parameter within the lower and upper limits.

12. A method of fabricating an integrated circuit on a semiconductor chip, the method comprising:
designing an architecture of the integrated circuit, the architecture including first and second standard cells configured to implement a same basic function;
designing an integrated circuit layout corresponding to the integrated circuit architecture; and
fabricating the integrated circuit on the semiconductor chip according to the integrated circuit layout;
wherein designing the integrated circuit layout includes:

creating first and second cell layouts having at least one layout difference from each other;

using the first cell layout to implement the first standard cell in the integrated circuit layout; and using the second cell layout to implement the second standard cell in the integrated circuit layout, wherein creating the first and second cell layouts includes:

calculating a maximum area, using design rules, for a standard cell layout;

dividing the maximum area into several surface units;

generating a random number;

generating an additional structural element having a surface that includes a number of units equal to the generated random number; and incorporating the additional structural element within the maximum area of the standard cell layout.

13. A method of fabricating an integrated circuit on a semiconductor chip, comprising:

designing an architecture of the integrated circuit, the architecture including first and second standard cells configured to implement a same basic function, wherein defining the architecture of the integrated circuit includes defining, in the architecture of the integrated circuit, at least one area to be protected against reverse engineering and at least one area not to be protected against reverse engineering;

designing an integrated circuit layout corresponding to the integrated circuit architecture; and fabricating the integrated circuit on the semiconductor chip according to the integrated circuit layout;

wherein designing the integrated circuit layout includes:

creating first and second cell layouts having at least one layout difference from each other;

using the first cell layout to implement the first standard cell in the integrated circuit layout;

using the second cell layout to implement the second standard cell in the integrated circuit layout;

using different cell layouts presenting random differences to implement several instances of a standard cell in the area of the integrated circuit layout to be protected; and using a single cell layout to implement several instances of a standard cell in the area of the integrated circuit layout not to be protected.

14. A non-transitory computer readable medium including code contents configured to cause a processor to perform a method comprising:

designing an integrated circuit layout corresponding to an integrated circuit architecture that includes first and second standard cells configured to implement a same basic function, wherein designing the integrated circuit layout includes:

designing a plurality of cell layouts for the basic function, each cell layout presenting differences with respect to the other cell layouts, the plurality of cell layouts including first and second cell layouts having at least one layout difference from each other;

storing the plurality of cell layouts in a library;

randomly selecting the first cell layout in the library and using the randomly selected first cell layout to implement the first standard cell in the integrated circuit layout; and randomly selecting the second cell layout in the library and using the randomly selected second cell layout to implement the second standard cell in the integrated circuit layout.

15. A computer readable medium according to claim 14, in which the first and second layouts are configured to implemented in a fabricated integrated circuit as first and second integrated circuit cells having the same electrical properties.

16. A computer readable medium according to claim 14, in which the first and second cell layouts are designed so that the at least one layout difference consists of only one or more static nodes.

17. A computer readable medium according to claim 14, wherein the method includes using the same cell layout at least twice to implement the first standard cell if the number of instances of the first standard cell is greater than the number of cell layouts available to implement the first standard cell in the integrated circuit layout.

18. A non-transitory computer readable medium including code contents configured to cause a processor to perform a method comprising:

designing an integrated circuit layout corresponding to an integrated circuit architecture that includes first and second standard cells configured to implement a same basic function, wherein designing the integrated circuit layout includes:

designing a preliminary cell layout for the basic function;

creating a first cell layout, wherein creating the first cell layout includes obtaining a first randomly altered cell layout by randomly altering the preliminary cell layout;

using the first randomly altered cell layout to implement the first standard cell;

creating a second cell layout, wherein creating the second cell layout includes obtaining a second randomly altered cell layout by randomly altering the preliminary cell layout, the first and second randomly altered cell layouts having at least one layout difference from each other; and using the second randomly altered cell layout to implement the second standard cell.

19. A non-transitory computer readable medium including code contents configured to cause a processor to perform a method comprising:

designing an integrated circuit layout corresponding to an integrated circuit architecture that includes first and second standard cells configured to implement a same basic function, wherein designing the integrated circuit layout includes:

creating a first cell layout;

using the first cell layout to implement the first and second standard cells in the integrated circuit layout;

randomly altering the first cell layout of the second standard cell to obtain a second cell layout, the first and second cell layouts having at least one layout difference from each other; and using the second cell layout to implement the second standard cell in the integrated circuit layout.

20. A non-transitory computer readable medium including code contents configured to cause a processor to perform a method comprising:

designing an integrated circuit layout corresponding to an integrated circuit architecture that includes first and second standard cells configured to implement a same basic function, wherein designing the integrated circuit layout includes:

defining a standard cell layout for the first and second standard cells;

defining at least one customization parameter for at least one structural element of the standard cell layout;

randomly varying the customization parameter of the standard cell layout to create at least one of first and second cell layouts, the first and second cell layouts having at least one layout difference from each other;

using the first cell layout to implement the first standard cell in the integrated circuit layout; and using the second cell layout to implement the second standard cell in the integrated circuit layout.

21. A computer readable medium according to claim 20, wherein the customization parameter is a length of a polygon, a width of a polygon, a shape of a polygon, a distance between two polygons, a location of an interconnection, or a distance between two interconnections.

22. A computer readable medium according to claim 20, wherein the method includes:

defining lower and upper limits of the customization parameter; and selecting a random value of the customization parameter within the lower and upper limits.

23. A non-transitory computer readable medium including code contents configured to cause a processor to perform a method comprising:

designing an integrated circuit layout corresponding to an integrated circuit architecture that includes first and second standard cells configured to implement a same basic function, wherein designing the integrated circuit layout includes:

creating first and second cell layouts having at least one layout difference from each other;

using the first cell layout to implement the first standard cell in the integrated circuit layout; and using the second cell layout to implement the second standard cell in the integrated circuit layout, wherein creating the first and second cell layouts includes:

calculating a maximum area, using design rules, for a standard cell layout;

dividing the maximum area into several surface units;

generating a random number;

generating an additional structural element having a surface that includes a number of units equal to the generated random number; and incorporating the additional structural element within the maximum area of the standard cell layout.

24. A non-transitory computer readable medium including code contents configured to cause a processor to perform a method comprising:

designing an integrated circuit layout corresponding to an integrated circuit architecture that includes first and second standard cells configured to implement a same basic function, wherein designing the integrated circuit layout includes:

creating first and second cell layouts having at least one layout difference from each other;

using the first cell layout to implement the first standard cell in the integrated circuit layout; and using the second cell layout to implement the second standard cell in the integrated circuit layout;

defining, in the architecture of the integrated circuit, at least one area to be protected against reverse engineering and at least one area not to be protected against reverse engineering;

using different cell layouts presenting random differences to implement several instances of a standard cell in the area of the integrated circuit layout to be protected; and using a single cell layout to implement several instances of a standard cell in the area of the integrated circuit layout not to be protected.

* * * * *